(12) United States Patent
Lee et al.

(10) Patent No.: US 11,876,247 B2
(45) Date of Patent: Jan. 16, 2024

(54) ELECTROLYTE MEMBRANE FOR ALL-SOLID-STATE BATTERY, AND ALL-SOLID-STATE BATTERY INCLUDING SAME

(71) Applicant: LG ENERGY SOLUTION, LTD., Seoul (KR)

(72) Inventors: Jung-Pil Lee, Daejeon (KR); Eun-Bee Kim, Daejeon (KR); Ji-Hoon Ryu, Daejeon (KR); Suk-Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 240 days.

(21) Appl. No.: 17/312,741

(22) PCT Filed: Apr. 20, 2020

(86) PCT No.: PCT/KR2020/095072
§ 371 (c)(1),
(2) Date: Jun. 10, 2021

(87) PCT Pub. No.: WO2020/214016
PCT Pub. Date: Oct. 22, 2020

(65) Prior Publication Data
US 2022/0052418 A1     Feb. 17, 2022

(30) Foreign Application Priority Data
Apr. 18, 2019  (KR) .................. 10-2019-0045631

(51) Int. Cl.
| | |
|---|---|
| H01M 50/446 | (2021.01) |
| H01M 4/38 | (2006.01) |
| H01M 10/0565 | (2010.01) |
| H01M 4/02 | (2006.01) |

(52) U.S. Cl.
CPC ......... *H01M 50/446* (2021.01); *H01M 4/382* (2013.01); *H01M 10/0565* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2002/0076594 A1* | 6/2002 | Fukuda | H01M 8/1004 |
| | | | 429/492 |
| 2003/0124429 A1 | 7/2003 | Okada et al. | |
| 2003/0224244 A1 | 12/2003 | Inda et al. | |
| 2012/0295149 A1 | 11/2012 | Xie | |
| 2015/0221981 A1 | 8/2015 | Lee et al. | |
| 2016/0336618 A1 | 11/2016 | Lee et al. | |
| 2017/0317352 A1 | 11/2017 | Lee et al. | |
| 2018/0102522 A1 | 4/2018 | Yang | |
| 2018/0123181 A1 | 5/2018 | Son et al. | |
| 2020/0006779 A1 | 1/2020 | Lee et al. | |
| 2022/0200097 A1* | 6/2022 | Lee | H01M 10/0562 |

FOREIGN PATENT DOCUMENTS

| | | | |
|---|---|---|---|
| CA | 2 847 107 | * | 3/2013 |
| CN | 103700797 A | | 4/2014 |
| CN | 108023122 A | | 5/2018 |
| CN | 108448160 A | | 8/2018 |
| CN | 108630985 A | | 10/2018 |
| JP | 4053819 B2 | | 2/2008 |
| JP | 4961654 B2 | | 6/2012 |
| JP | 5207206 B2 | | 6/2013 |
| JP | 6215819 B2 | | 10/2017 |
| KR | 10-2013-0142224 A | | 12/2013 |
| KR | 10-2017-0124075 A | | 11/2017 |
| KR | 10-2018-0040494 A | | 4/2018 |
| KR | 10-2018-0076709 A | | 7/2018 |
| KR | 10-2018-0123913 A | | 11/2018 |
| KR | 10-2019-0027767 A | | 3/2019 |

OTHER PUBLICATIONS

International Search Report for PCT/KR2020/095072 dated Aug. 18, 2020.

* cited by examiner

*Primary Examiner* — Anca Eoff
(74) *Attorney, Agent, or Firm* — Birch, Stewart, Kolasch & Birch, LLP

(57) ABSTRACT

The present disclosure relates to a solid electrolyte membrane for an all-solid-state battery and a battery comprising the same. In the present disclosure, the battery may comprise lithium metal as a negative electrode active material. The solid electrolyte membrane for an all-solid-state battery according to the present disclosure comprises a guide layer comprising metal particles to guide the horizontal growth of lithium dendrites, thereby delaying an electrical short caused by dendrite growth. Additionally, the guide layer is formed by polymer self-assembly, and thus the metal particles may be uniformly distributed in a very regular pattern within the guide layer.

11 Claims, 6 Drawing Sheets

CONVENTIONAL ART

ELECTROLYTE MEMBRANE FOR ALL-SOLID-STATE BATTERY, AND ALL-SOLID-STATE BATTERY INCLUDING SAME

CROSS-REFERENCE TO RELATED APPLICATIONS

The present application is a National Stage filing under 37 C.F.R 371 of the international application No. PCT/KR2020/095072 filed on Apr. 20, 2020, which claims the benefit of Korean Patent Application No. 10-2019-0045631 filed on Apr. 18, 2019 with the Korean Intellectual Property Office, the disclosures of which are incorporated herein by reference in their entirety.

TECHNICAL FIELD

The present disclosure relates to an electrolyte membrane for an all-solid-state battery for suppressing the growth of lithium dendrites and an all-solid-state battery comprising the electrolyte membrane.

BACKGROUND ART

In lithium ion batteries using liquid electrolytes, the negative electrode and the positive electrode are separated by the separator, and when the separator is damaged by deformation or external impacts, short circuits may occur, causing overheat or explosions. Accordingly, it is very important to develop solid electrolytes with safety in the field of lithium ion secondary batteries.

Lithium secondary batteries using solid electrolytes have enhanced safety of the batteries, prevent the leakage of the electrolytes, leading to improved reliability of the batteries, and are easy to manufacture thin batteries. Additionally, they have improved energy density due to the use of lithium metal for the negative electrode, and accordingly, together with small secondary batteries, they gain much attention as next-generation batteries in expectation of high capacity secondary batteries for electric vehicles.

Solid electrolyte materials generally include polymer-based solid electrolyte, oxide-based solid electrolyte and sulfide-based solid electrolyte materials. When a thin-film free standing type electrolyte membrane is manufactured using the solid electrolyte material alone, defects such as tears or cracks or separation of the electrolyte material may occur during the manufacture of the battery or while in use. Particularly, when lithium metal is used as the negative electrode active material, there is a problem with the growth of lithium dendrites from the surface of the negative electrode, and when the grown lithium dendrites contact the positive electrode, a short circuit occurs in the battery. FIG. 1 is a diagram showing an all-solid-state battery manufactured with the solid electrolyte membrane interposed between the negative electrode and the positive electrode. In the all-solid-state battery, the solid electrolyte membrane serves as an electrical insulator for the positive electrode and the negative electrode in place of the separator. In particular, when a polymer material is used as the solid electrolyte, the solid electrolyte membrane may be damaged by the growth of lithium dendrites. Referring to FIG. 1, lithium dendrites grown from the negative electrode may damage the solid electrolyte membrane, causing a short circuit between the positive electrode and the negative electrode. Additionally, an inorganic solid electrolyte generally includes a particulate ion conducting inorganic material with a layered structure, and a plurality of pores is formed by the interstitial volume between the particles. Lithium dendrites may grow in the space provided by the pores, and when the lithium dendrites grown through the pores contact the positive electrode, a short circuit may occur. Accordingly, there is a need to develop electrolyte membranes for all-solid-state batteries for suppressing lithium dendrite growth.

DISCLOSURE

Technical Problem

The present disclosure is designed to solve the above-described technical problem, and therefore the present disclosure is directed to providing a solid electrolyte membrane for suppressing the growth of lithium dendrites and an all-solid-state battery comprising the same. These and other objects and advantages of the present disclosure will be understood by the following description. Additionally, it will be readily appreciated that the objects and advantages of the present disclosure may be realized by means or methods described in the appended claims and a combination thereof.

Technical Solution

The present disclosure relates to a solid electrolyte membrane for solving the above-described technical problem. A first aspect of the present disclosure relates to the solid electrolyte membrane comprising a guide layer, wherein the solid electrolyte membrane comprises a solid electrolyte material and metal particles, the metal particles form an alloy with lithium, the guide layer is disposed in a layer shape within the solid electrolyte membrane and is patterned such that the guide layer comprises a plurality of pattern units comprising a guide material, and the pattern units are regularly distributed in the guide layer.

According to a second aspect of the present disclosure, in the first aspect, the guide layer comprises the guide material and copolymer to which the guide material is chemically bonded, the guide layer has a fine pattern derived from self-assembly of the copolymer, the copolymer comprises a functional group capable of forming a chemical bond with the guide material, and the guide material and the copolymer are bonded through the functional group.

According to a third aspect of the present disclosure, in the first or second aspect, the metal particles have Li metal nucleation overpotential of 100 mV or less.

According to a fourth aspect of the present disclosure, in at least one of the first to third aspects, the solid electrolyte membrane comprises at least one of Au, Ag, Pt, Zn, Mg, Al, Ni and Bi as the metal particles.

According to a fifth aspect of the present disclosure, in at least one of the first to fourth aspects, the guide layer is 1 nm to 1,000 nm in thickness.

According to a sixth aspect of the present disclosure, in at least one of the first to fifth aspects, the solid electrolyte material comprises a polymer-based solid electrolyte material.

According to a seventh aspect of the present disclosure, in at least one of the first to sixth aspects, the polymer-based solid electrolyte material comprises a polymer resin and a lithium salt, and exhibits ionic conductivity of $1 \times 10^{-7}$ S/cm or above.

According to an eighth aspect of the present disclosure, in at least one of the first to seventh aspects, the metal particles have a particle size of 1 nm to 5 μm.

According to a ninth aspect of the present disclosure, in at least one of the first to eighth aspects, the metal particles are present in an amount of 0.1 wt % to 20 wt % based on 100 wt % of the solid electrolyte membrane.

A tenth aspect of the present disclosure relates to an all-solid-state battery comprising the solid electrolyte membrane according to at least one of the first to ninth aspects.

According to an eleventh aspect of the present disclosure, in the tenth aspect, the all-solid-state battery comprises a negative electrode comprising a lithium metal as a negative electrode active material or a current collector with no negative electrode active material.

According to a twelfth aspect of the present disclosure, in at least one of the ten and eleventh aspects, the all-solid-state battery comprises a negative electrode, a positive electrode and a solid electrolyte membrane, the solid electrolyte membrane is interposed between the negative electrode and the positive electrode, at least one of the negative electrode and the positive electrode comprises a solid electrolyte material, and the solid electrolyte material comprises at least one of a polymer-based solid electrolyte, an oxide-based solid electrolyte and a sulfide-based solid electrolyte.

Advantageous Effects

The solid electrolyte membrane according to the present disclosure has a guide layer including a guide material therein to guide the growth direction of lithium dendrites. The guide material is metal capable of forming an alloy with lithium to guide the horizontal growth of lithium dendrites. Even though lithium dendrites grow from the negative electrode, it is possible to prevent the lithium dendrites from growing in the vertical direction and going through the solid electrolyte membrane or contacting the positive electrode. Additionally, the guide layer includes the guide material in a uniform pattern, thereby achieving uniform ionic conductivity over the solid electrolyte membrane. Accordingly, when the solid electrolyte membrane is applied to a lithium metal battery including lithium metal as a negative electrode active material, the life characteristics of the battery are improved.

BRIEF DESCRIPTION OF THE DRAWINGS

The accompanying drawings illustrate a preferred embodiment of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

DETAILED DESCRIPTION

Figure 1:
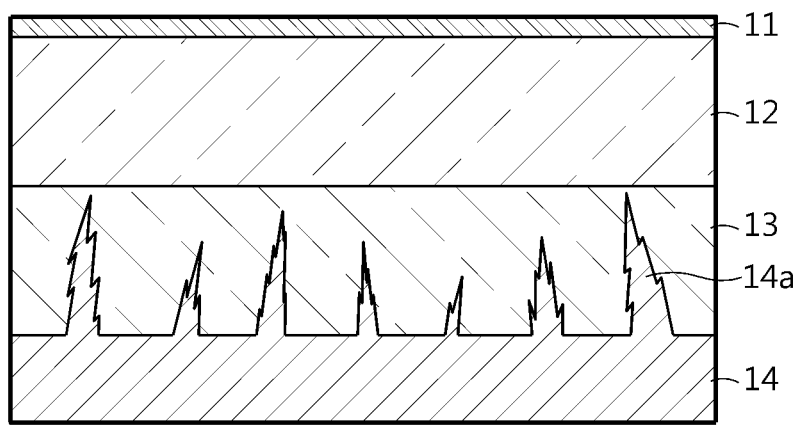
FIG. 1 is a schematic diagram of a cross-sectional structure of a conventional solid electrolyte battery.

Hereinafter, the embodiments of the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the context in the embodiments described herein is just a most preferred embodiment of the present disclosure, but not intended to fully describe the technical aspects of the present disclosure, so it should be understood that other equivalents and modifications could have been made thereto at the time the application was filed.

The term ⌜comprises⌟ when used in this specification, specifies the presence of stated elements, but does not preclude the presence or addition of one or more other elements, unless the context clearly indicates otherwise.

The terms ⌜about⌟ and ⌜substantially⌟ are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

⌜A and/or B⌟ when used in this specification, specifies ⌜either A or B or both⌟.

The terms as used in the following detailed description are for the purpose of convenience, but not intended to being limiting. The terms 'right', 'left' top' and 'bottom' refer to the directions in the drawings to which reference is made. The terms 'inward' and 'outward' refer to the directions toward or away from the geometrical centers of the designated devices, systems and elements thereof. The terms 'front', 'rear', 'up', 'down' and related words and phrases refer to the locations and directions in the drawings to which reference is made and are not limiting. These terms include the above words and their derivatives and synonyms.

The present disclosure relates to an electrolyte membrane for an all-solid-state battery and an all-solid-state battery comprising the same. The solid electrolyte membrane according to the present disclosure suppresses the vertical growth of lithium dendrites, thereby significantly improving the life characteristics of batteries, especially when applied to batteries using lithium metal as a negative electrode active material.

Figure 2A:
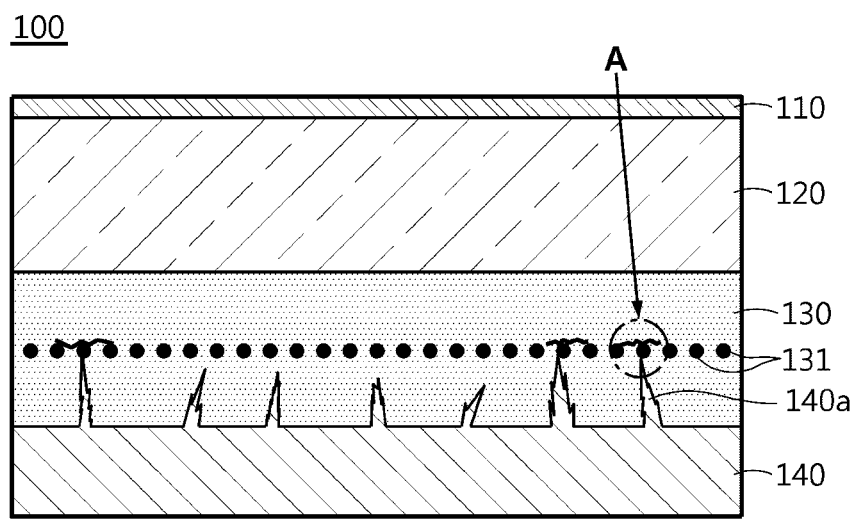
FIG. 2a is a schematic diagram of a cross-sectional structure of a solid electrolyte membrane according to the present disclosure.

FIG. 2a is a schematic diagram of the solid electrolyte membrane according to the present disclosure. The solid electrolyte membrane of the present disclosure will be described in detail with reference to FIG. 2a.

The solid electrolyte membrane according to the present disclosure includes a solid electrolyte material and metal particles. The metal particles are a guide material to guide the growth direction of lithium dendrites, and they are included in a layer shape within the solid electrolyte membrane. FIG. 2a is a schematic diagram of the solid electrolyte membrane and the all-solid-state battery comprising the same according to an embodiment of the present disclosure. Referring to FIG. 2a, the solid electrolyte membrane includes a guide layer, and the guide layer includes a guide material. Hereinafter, the present disclosure will be described in more detail with reference to FIG. 2a.

In an embodiment of the present disclosure, the solid electrolyte membrane is interposed between the positive electrode and the negative electrode in the all-solid-state battery and acts as an insulating and ion conducting channel. The solid electrolyte membrane preferably has ionic conductivity of $1.0 \times 10^{-7}$ S/cm or above. The solid electrolyte membrane includes a solid electrolyte material and metal particles which are a guide material, and the metal particles are included in a layer shape within the solid electrolyte membrane. Referring to FIG. 2a, the solid electrolyte membrane has the guide layer disposed at a predetermined depth based on the thickness direction, and the metal particles as the guide material are distributed and distributed along the guide layer. When the metal particles are disposed in the guide layer disposed at the predetermined depth of the solid electrolyte membrane, the metal particles do not directly contact the electrode active material and are spaced apart from the electrode active material, and as a result, it is possible to control the further vertical growth of lithium dendrites penetrating and grown into the solid electrolyte membrane without affecting the electrochemical performance of the electrode active material in the electrode.

In the present disclosure, the metal particles may form an alloy by reaction with lithium. Additionally, the metal particles serve to guide the growth direction of lithium dendrites, and the metal particles react with lithium dendrites vertically growing from the negative electrode toward the positive electrode (i.e., grow along the thickness direction of the solid electrolyte membrane) so that the lithium dendrites are guided to grow in the horizontal direction (i.e., grow along the plane direction of the solid electrolyte membrane). That is, lithium dendrites are formed on the surface of the negative electrode and grow toward the positive electrode, and when the lithium dendrites contact the metal particles, the dendrite growth is shifted in the horizontal direction. In an embodiment of the present disclosure, the metal particles may be, for example, Au, Ag, Pt, Zn, Mg, Al, Ni and Bi, and the solid electrolyte membrane according to the present disclosure may include at least one of them.

Additionally, the metal particles may have Li metal nucleation overpotential of 100 mV or less, and preferably 50 mV or less. Here, the Li metal nucleation overpotential refers to a difference between the bottom of the voltage drop and the flat region of the plateau voltage at the time of alloy formation with lithium. The lower overpotential is more advantageous for alloy formation upon contact with Li dendrites.

In an embodiment of the present disclosure, the particle size of the metal particles is 1 nm to 5 µm. For example, the particle size may be adjusted in the range of 10 nm to 1 µm. When the particle size is below the above-described range, it is easy to form an alloy upon contact with lithium dendrites, but the metal particles are not uniformly dispersed in the guide layer. On the contrary, when the particles are very large in size, it is difficult to form an alloy.

In the present disclosure, the metal particles have a spherical shape or a quasi-spherical shape similar to a spherical shape for stable structure in the formation of seed crystals upon contact with lithium dendrites. However, the metal particles are not limited to the spherical or quasi-spherical shape.

The metal particles may be present in an amount of 0.1 wt % to 20 wt %, and preferably 1 wt % to 10 wt % based on 100 wt % of the solid electrolyte membrane. When the amount of the metal particles satisfies the above-described range, it is possible to provide a remarkable effect on the suppression of lithium dendrite growth and improvement of life characteristics without decrease in ionic conductivity of the solid electrolyte membrane.

In the case of lithium, energy required for dendrite growth is lower than energy required for seed crystal production, and thus lithium deposition leads to dendrite growth. However, as described above, materials having low Li metal nucleation overpotential are thermodynamically similar to lithium. Accordingly, when the metal particles included in the solid electrolyte contact the dendritically grown lithium metal, they are electrically connected to form new seed crystals, i.e., a lithium alloy around the metal particles, and lithium is deposited by the selective reduction of Li ions on the surface of the seed crystals. During deposition, lithium grows around the seed crystals or in the horizontal direction.

As described above, the electrolyte membrane according to the present disclosure suppresses penetration of lithium dendrites growing through the electrolyte membrane, thereby improving the durability of the solid electrolyte membrane. Additionally, even though lithium dendrites grow, the lithium dendrites contact the positive electrode less frequently, resulting in significant delays in the short circuit occurrence time during the operation of the battery.

Figure 2B:
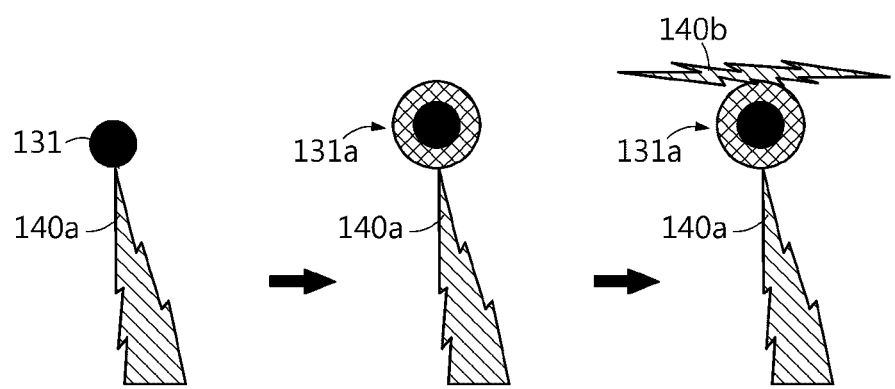
FIG. 2b is an enlarged view of section A in FIG. 2a, schematically showing the mechanism in which vertically growing lithium dendrites grow in the horizontal direction after forming an alloy with metal particles.

FIG. 2a schematically illustrates the all-solid-state battery comprising the solid electrolyte membrane according to the present disclosure. The all-solid-state battery includes a positive electrode current collector 110, a positive electrode active material layer 120, a solid electrolyte membrane 130 and a lithium metal negative electrode 140, stacked in that order. Here, metal particles 131 are dispersed and distributed in the solid electrolyte membrane. During the operation of the battery, lithium dendrites vertically grow from the lithium metal negative electrode 140, and as shown in FIG. 2b, when the lithium dendrites contact the metal particles 131, the metal particles and the lithium form an alloy, producing seed crystals, and subsequently, the lithium dendrites grow in the horizontal direction. In FIG. 2b, 140a indicates the vertical growth of lithium dendrites, and 140b indicates the horizontal growth. FIG. 2b is an enlarged view of section A in FIG. 2a, schematically showing the formation of seed crystals and the horizontal growth of lithium dendrites.

Figure 3:
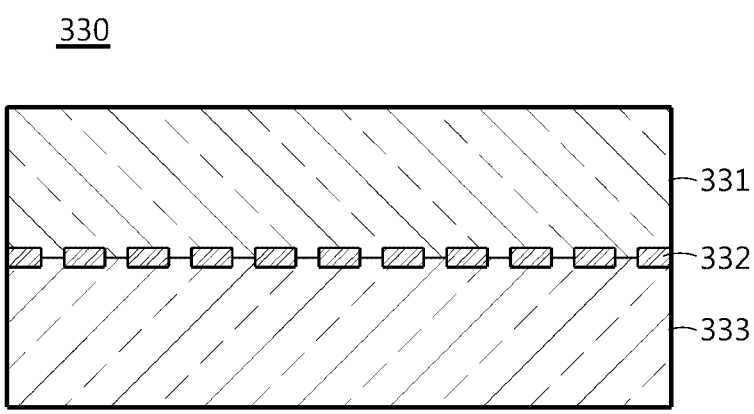
FIGS. 3 and 4 are schematic diagrams of a cross-sectional structure of a patterned guide layer.

According to a specific embodiment of the present disclosure, the guide material may be dispersed in a uniform distribution over the entire guide layer. In an embodiment of the present disclosure, the guide layer may be formed in a pattern by regular arrangement of pattern units including the guide material. The pattern unit is a part of the guide layer including the guide material at high concentration of, for example, 50 wt % or above. The pattern unit may include the guide material alone or in combination with the solid electrolyte material where necessary. A region having no pattern unit between the pattern units may be embedded by solid electrolyte films stacked on and below the guide layer, or may be filled with a separate solid electrolyte material. FIG. 3 shows an embodiment of the solid electrolyte membrane 330 including the guide layer, and is a schematic cross-sectional view. Here, the guide layer 332 is interposed between an upper solid electrolyte film 331 and a lower solid electrolyte film 333, and includes a plurality of pattern units. Here, the pattern units are not limited to a particular shape, and for example, may have a flat plane shape of stripe or dot. The terms upper and lower indicate the relative position on the basis of the drawing, and do not describe the absolute position.

In an embodiment of the present disclosure, the guide layer may be formed by putting the guide material into an appropriate solvent to prepare a guide material solution and coating the guide material solution on the surface of the solid electrolyte film. When the guide layer is introduced in this way, the guide layer may be very thin. Additionally, the solution may be coated such that the guide layer has a shape of stripe or dot, and in this case, the region having no pattern unit is so thin that it is embedded by the solid electrolyte films stacked on and below, thereby minimizing the gap between the upper and lower solid electrolyte films or the resulting interfacial resistance. In an embodiment of the present disclosure, the solvent may be an organic solvent such as N-methyl pyrrolidone (NMP), dimethyl formamide (DMF), tetrahydrofuran, dimethoxyethane, nitromethane, acetone, pyridine, ethanol, acetonitrile and dimethyl acetamide, or water, and these solvent may be used alone or in combination.

In a specific embodiment of the present disclosure, the pattern formation in the guide layer may be accomplished by a method of coating the mixture or the solution on the solid electrolyte film in a pattern, a method of patterning the guide layer on a separate release sheet and transferring the patterned guide layer to the solid electrolyte film, or a method of patterning the solid electrolyte film using lithography. When the pattern is imparted to the guide layer, after the patterning process is performed, the guide material may be further exposed through $O_2$ plasma, UV-ozone or etching.

Additionally, in a specific embodiment of the present disclosure, the patterned guide layer may be formed by self-assembly of copolymers whereby very fine pattern units of nanometer level may be arranged on the guide layer in a uniform distribution. The guide layer formed by self-assembly of copolymers includes the guide material and the copolymer, and the guide material is chemically bonded to the copolymer. In the specification, 'chemically bonded' refers to bonding between the guide material and the copolymer by a chemical method such as ion bond, covalent bond, and coordinate bond.

In the patterning of the guide material by self-assembly according to an embodiment of the present disclosure, the copolymer includes a functional group capable of forming chemical bonds with the guide material, that is, the guide material is bonded to the copolymer through the functional group. In an embodiment of the present disclosure, the functional group may include at least one selected from functional groups including oxygen or nitrogen, which is capable of forming bonds with metal salts. For example, the functional group may include at least one selected from ether and amine. The bond is formed by the action of an attraction force between (−) charge of the oxygen or nitrogen in the functional group and (+) charge of the metal ion in the metal salt.

The copolymer may include polystyrene-blockpoly (2-vinylpyridine) copolymer, polystyrene-block-poly(4-vinylpyridine) copolymer, poly(1,4-isoprene)-blockpolystyrene-block-poly(2-vinylpyridine) copolymer and polystyrene-block-poly(ethylene oxide) copolymer, and the copolymer is not limited to a particular type and may include any type of copolymer including the above-described functional group if it can form a nano-scale fine pattern by self-assembly.

Figure 5:
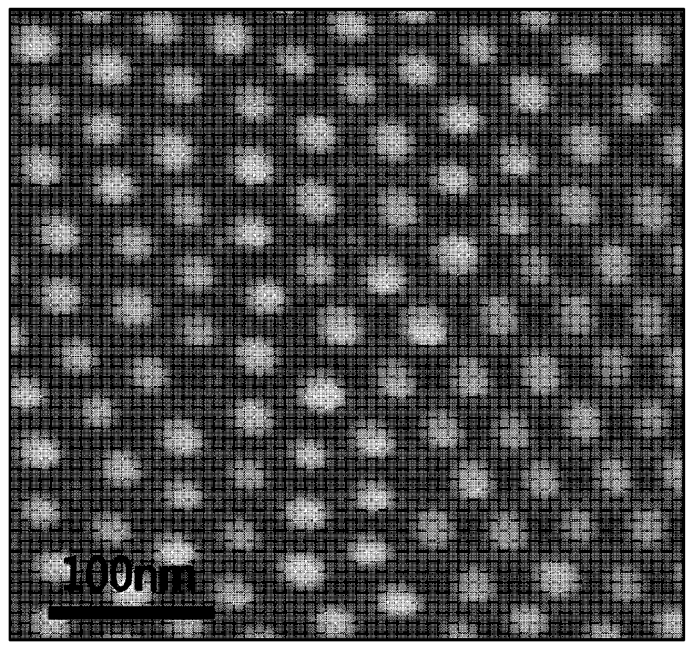
FIG. 5 shows an atomic force microscopy (AFM) image of a guide layer prepared in Example 1.

In a specific embodiment of the present disclosure, the guide layer may show a hexagonal close-packed arrangement of micelles formed by the self-assembled block copolymer. For example, when polystyrene-block-poly4vinyl pyridine is used as the block copolymer, micelles primarily including polyvinyl pyridine (PVP) block are arranged in a matrix primarily including polystyrene (PS) block according to a regular rule by self-assembly, and the guide material bonded to the PVP block may achieve a high level of uniform dispersion over the entire guide layer due to the arrangement of the micelles. The micelle may include a core and a shell covering the surface of the core, and the guide material is bonded to the core and/or the shell. FIG. 5 is an atomic force microscopy (AFM) image of the guide layer prepared in Example 1, showing the hexagonal close-packed arrangement of micelles on the surface of the solid electrolyte film.

In a specific embodiment of the present disclosure, the guide layer may be formed with a very small thickness on nanometer scale of 1 nm to 1 µm, and preferably 100 nm or less, for example, 50 nm or less, 30 nm or less or 10 nm or less.

Figure 4:
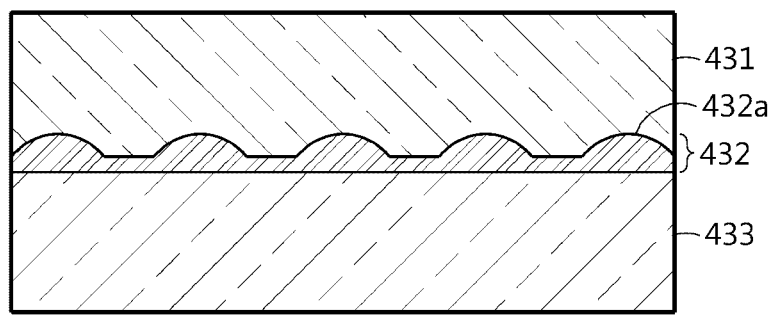

FIG. 4 is a schematic cross-sectional view of the solid electrolyte membrane 430 according to an embodiment of the present disclosure, showing that the guide layer 432 is interposed between the upper solid electrolyte film 431 and the lower solid electrolyte film layer 433 and is formed by self-assembly of copolymers. According to FIG. 4, the micelle, in particular, the core 432a is thicker, and the region between micelles is thinner. Alternatively, there may be no matrix between micelles depending on the process condition, for example, the spin coating rate, the concentration of the micelle solution, etc. Accordingly, even though the guide layer is coated on the majority of surface of the solid electrolyte film, it is possible to allow lithium ions to permeate through the matrix, thereby properly maintaining the ionic conductivity of the solid electrolyte membrane, and even though there is a slight reduction in ionic conductivity, there is no problem using the solid electrolyte membrane. In an embodiment of the present disclosure, the thickness of the guide layer may be adjusted through $O_2$ plasma or UV-ozone treatment. As described above, it is possible to achieve ion conduction, and at the same time, suppress the growth of lithium dendrites by the guide material bonded to the core of the micelle.

In a specific embodiment of the present disclosure, the size of the micelle may be 20 nm to 300 nm, and the distance between micelles may be 10 nm to 500 nm.

The electrolyte membrane according to the present disclosure suppresses penetration of lithium dendrites growing through the electrolyte membrane, thereby improving the durability of the solid electrolyte membrane. Additionally, even though lithium dendrites grow, the lithium dendrites contact the positive electrode less frequently, resulting in significant delays in the short circuit occurrence time during the operation of the battery.

In an embodiment of the present disclosure, the solid electrolyte material exhibits ionic conductivity, and may include at least one of a polymer-based solid electrolyte material, an oxide-based solid electrolyte material and a sulfide-based solid electrolyte.

The polymer-based solid electrolyte is a composite of a lithium salt and a polymer resin, i.e., a polymer electrolyte material formed by adding a polymer resin to a solvated lithium salt, and may exhibit ionic conductivity of about $1 \times 10^{-7}$ S/cm or above, and preferably about $1 \times 10^{-5}$ S/cm or above.

Non-limiting examples of the polymer resin may include at least one of polyether-based polymer, polycarbonate-based polymer, acrylate-based polymer, polysiloxane-based polymer, phosphazene-based polymer, polyethylene derivatives, alkylene oxide derivatives such as polyethylene oxide, phosphate ester polymer, poly agitation lysine, polyester sulfide, polyvinyl alcohol, polyvinylidene fluoride and polymer including ionic dissociable groups. Additionally, the polymer resin may include, for example, a comb-like polymer resin, a crosslinked polymer resin and a branched copolymer obtained by copolymerization of a comonomer of amorphous polymer such as PMMA, polycarbonate, polysiloxane (pdms) and/or phosphazene in the main chain of polyethylene oxide (PEO), and the polymer electrolyte may include at least one of them as the polymer resin.

In the electrolyte of the present disclosure, the lithium salt is an ionizable lithium salt and may be represented as $Li^+X^-$. The anion of the lithium salt is not particularly limited, and may include, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The oxide-based solid electrolyte material contains oxygen (O) and has ionic conductivity of metal belonging to Group I or II of the periodic table. Non-limiting examples of the oxide-based solid electrolyte material may include at least one selected from LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, LAGP-based compounds, LATP-based compounds, $Li_{1+x}Ti_{2-x}Al_xSi_y(PO_4)_{3-y}$ ($0\leq x\leq 1$, $0\leq y\leq 1$), $LiAl_xZr_{2-x}(PO_4)_3$ ($0\leq x\leq 1$, $0\leq y\leq 1$), $LiTi_xZr_{2-x}(PO_4)_3$ ($0\leq x\leq 1$, $0\leq y\leq 1$), LISICON-based compounds, LIPON-based compounds, perovskite-based compounds, NASICON-based compounds and LLZO-based compounds. However, the oxide-based solid electrolyte material is not particularly limited thereto.

The sulfide-based solid electrolyte material contains sulfur (S) and has ionic conductivity of metal belonging to Group I or Group II of the periodic table, and may include Li—P—S-based glass or Li—P—S-based glass ceramics. Non-limiting examples of the sulfide-based solid electrolyte may include at least one of $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$ and $Li_2S$—$GeS_2$—$ZnS$. However, the sulfide-based solid electrolyte material is not particularly limited thereto.

In an embodiment of the present disclosure, the solid electrolyte membrane may further include binder resin where necessary. The binder resin may be introduced for binding of the solid electrolyte materials and binding of the solid electrolyte membrane and the battery elements (for example, support layers and/or electrodes) stacked on the two sides of the solid electrolyte membrane. The material of the binder resin is not particularly limited and may be appropriately selected within the range of components used as binders for electrochemical devices.

In the present disclosure, the solid electrolyte membrane is about 100 μm or less, and preferably about 15 μm to 90 μm in thickness. The solid electrolyte membrane may have an appropriate thickness within the above-described range, taking into account the ionic conductivity, the physical strength and the energy density of the used battery. For example, in terms of the ionic conductivity or energy density, the thickness may be 80 μm or less, or 70 μm or less, or 60 μm or less, or 50 μm or less. In terms of the physical strength, the thickness may be 20 μm or more, or 30 μm or more, or 40 μm or more. Along with the above-described thickness range, the solid electrolyte membrane may have the tensile strength of about 500 $kgf/cm^2$ to about 2,000 $kgf/cm^2$. Additionally, the solid electrolyte membrane may have the porosity of 15 vol % or less or about 10 vol % or less.

The solid electrolyte membrane according to the present disclosure may be obtained by any method for obtaining solid electrolyte membranes having the above-described feature, and the present disclosure is not limited to a particular method. In an embodiment of the present disclosure, the solid electrolyte membrane may be obtained, for example, by preparing two solid electrolyte films, forming a guide layer on the surface of any one solid electrolyte film (the lower solid electrolyte film), stacking the remaining solid electrolyte film (the upper solid electrolyte film) on the guide layer such that the guide layer is disposed inside the solid electrolyte membrane and applying the pressure to laminate them.

The solid electrolyte film is an ionic conductive film including a solid electrolyte material, and may be obtained, for example, by the following method.

First, a solid electrolyte material is added to a suitable solvent to prepare a dispersion for preparing a solid electrolyte film.

The solvent may be appropriately selected depending on the used solid electrolyte material. In an embodiment of the present disclosure, the solvent may be an organic solvent such as N-methyl pyrrolidone (NMP), dimethyl formamide (DMF), tetrahydrofuran, dimethoxyethane, nitromethane, acetone, pyridine, ethanol, acetonitrile and dimethyl acetamide, or water, and these solvents may be used alone or in combination. For example, when alkylene oxide such as ethylene oxide (PEO) is used for the polymer resin, acetonitrile may be used for the solvent. Subsequently, the dispersion is applied to a release sheet such as a terephthalate film and formed into the shape of a film having a predetermined thickness. A known coating method such as a doctor blade may be used to apply and form. Subsequently, drying is performed to remove the solvent, thereby obtaining the solid electrolyte film.

Subsequently, a guide layer is formed on the surface of the solid electrolyte film prepared by the above-described method. Regarding the method for forming the guide layer, a reference may be made to the above-described method.

After the guide film is formed on the surface of any one solid electrolyte film, the remaining solid electrolyte film may be stacked on the guide layer, and the two electrolyte films may be joined by calendaring or lamination. The solid electrolyte membrane of the structure shown in FIG. 2a may be obtained.

In a specific embodiment of the present disclosure, three or more solid electrolyte films may be stacked, and the solid electrolyte membrane including two or more guide layers may be prepared by forming the guide layer between each electrolyte film.

Additionally, the present disclosure provides an all-solid-state battery comprising the above-described solid electrolyte membrane. The all-solid-state battery comprises a positive electrode, a negative electrode and a solid electrolyte membrane. In an embodiment of the present disclosure, the negative electrode may comprise lithium metal as a negative electrode active material.

In the present disclosure, the negative electrode and the positive electrode may comprise a current collector and an electrode active material layer formed on at least one surface of the current collector, and the active material layer comprises electrode active material particles and a solid electrolyte material. Additionally, each electrode may further comprise at least one of a conductive material and a binder resin where necessary. Additionally, the electrode may further comprise various types of additives to supplement or improve the physical and chemical properties of the electrode.

In the present disclosure, the negative electrode active material may include lithium metal as the negative electrode active material of lithium ion secondary batteries, and in addition to the lithium metal, any material that can be used as the negative electrode active material may be used. For example, the negative electrode active material may further include at least one selected from carbon such as non-graphitizable carbon and graphite-based carbon; metal composite oxide such as $Li_xFe_2O_3$ (0≤x≤1), $Li_xWO_2$ (0≤x≤1), $Sn_xMe_{1-x}Me^a{}_yO_z$ (Me: Mn, Fe, Pb, Ge; $Me^a$: Al, B, P, Si, Group I, Group II and Group III elements of the periodic table, halogen (0<x≤1; 1≤y≤3; 1≤z≤8); lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$ $Bi_2O_4$ and $Bi_2O_5$; conductive polymer such as polyacetylene; Li—Co—Ni based materials; titanium oxide; lithium titanium oxide.

The electrode active material of the positive electrode may include, without limitation, any type of positive electrode active material of lithium ion secondary batteries. For example, the positive electrode active material may include layered compounds such as lithium cobalt oxide ($LiCoO_2$) and lithium nickel oxide ($LiNiO_2$) or compounds with one or more transition metal substitution; lithium manganese oxide of Formula $Li_{1+x}Mn_{2-x}O_4$ (x is 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$ and $Cu_2V_2O_7$; Ni-site type lithium nickel oxide represented by Formula $LiNi_{1-x}M_xO_2$ (M=Co, Mn, Al, Cu, Fe, Mg, B or Ga, and x=0.01 to 0.3); lithium manganese composite oxide represented by Formula $LiMn_{2-x}M_xO_2$ (M=Co, Ni, Fe, Cr, Zn or Ta, x=0.01 to 0.1) or $Li_2Mn_3MO_8$ (M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in Formula; disulfide compounds; $Fe_2(MoO_4)_3$. However, the positive electrode active material is not limited thereto.

In the present disclosure, the current collector may be, for example, a metal plate that exhibits electrical conductivity, and a suitable current collector may be used according to the polarity of the electrode among the current collectors that are well known in the field of secondary batteries.

In the present disclosure, the conductive material is generally included in an amount of 1 wt % to 30 wt % based on the total weight of the mixture including the electrode active material. The conductive material is not limited to a particular type and may include those having conductivity without causing a chemical change in the corresponding battery, for example, at least one selected from graphite such as natural graphite or artificial graphite; carbon black such as carbon black, acetylene black, ketjen black, channel black, furnace black, lamp black, and thermal black; conductive fibers such as carbon fibers or metal fibers; fluorocarbon; metal powder such as aluminum powder and nickel powder; conductive whiskers such as zinc oxide and potassium titanate; conductive metal oxide such as titanium oxide; conductive materials such as polyphenylene derivatives.

In the present disclosure, the binder resin is not limited to a particular type and may include any type of component that assists in the binding of the active material and the conductive material and binding to the current collector, for example, polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer (EPDM), sulfonated EPDM, styrene butadiene rubber, fluorine rubber and a variety of copolymers. The binder resin may be generally included in the range of 1 wt % to 30 wt %, or 1 wt % to 10 wt % based on 100 wt % of the electrode layer.

In the present disclosure, each electrode active material layer may comprise at least one type of additive of an oxidation stabilizing agent, a reduction stabilizing agent, a flame retardant, a heat stabilizer and an antifogging agent where necessary.

In the present disclosure, the solid electrolyte material comprised in the electrode may include at least one of a polymer-based solid electrolyte, an oxide-based solid electrolyte and a sulfide-based solid electrolyte, and with regard to the description of each electrolyte material, a reference is made to the foregoing description.

In the solid electrolyte material, in the case of the positive electrode, electrolyte materials with good oxidation stability may be used as the solid electrolyte. In the case of the negative electrode, electrolyte materials with good reduction stability may be used as the solid electrolyte. However, the present disclosure is not limited thereto, and due to the main role of transporting lithium ions in the electrode, any material having high ionic conductivity of, for example, $10^{-7}$ s/cm or above, or $10^{-5}$ s/cm or above, may be used without limitation.

Additionally, the present disclosure provides a secondary battery having the above-described structure. Additionally, the present disclosure provides a battery module including the secondary battery as a unit battery, a battery pack including the battery module and a device including the battery pack as a power source. In this instance, a specific example of the device may include, but is not limited to, power tools; electric vehicles including Electric Vehicles (EVs), Hybrid Electric Vehicles (HEVs), Plug-in Hybrid Electric Vehicles (PHEVs); electric two wheelers including E-bikes and E-scooters; electric golf carts; and power storage systems, operated by power from an electric motor.

Hereinafter, the present disclosure is described in more detail through examples, but the following examples are provided to describe the present disclosure by way of illustration, and the scope of the present disclosure is not limited thereto.

Example 1

(1) Preparation of Lower Solid Electrolyte Film

Polyethylene oxide (PEO) (Mw=4,000,000 g/mol) is dissolved in a solvent, acetonitrile (AN) to prepare a 4 wt % polymer solution. In this instance, a lithium salt LiTFSI is added such that [EO]/[Li$^+$]=18/1 (molar ratio). The polymer solution is stirred overnight at 70° C. to sufficiently dissolve the PEO and the lithium salt. Subsequently, an additive solution including an initiator and a curing agent is prepared. The curing agent is polyethylene glycol diacrylate (PEGDA) (Mw=575), and the initiator is benzoyl peroxide (BPO). The PEGDA is present in an amount of 20 wt % based on the PEO, and the BPO is present in an amount of 1 wt % based on the PEGDA. The used solvent is acetonitrile. The additive solution is stirred for about 1 hour to mix the added components well. Subsequently, the additive solution is added to the polymer solution and the two solutions are sufficiently mixed together. The mixed solution is applied and coated on a release film using a doctor blade. The coating gap is 800 μm, and the coating speed is 20 mm/min. The release film coated with the solution is moved to a glass plate, keeping it horizontal, dried overnight at room temperature, and dried under a vacuum at 100° C. for 12 hours. In this way, a lower solid electrolyte film is obtained. The obtained lower solid electrolyte film is about 50 μm in thickness.

(2) Preparation of Guide Layer

Polystyrene-block-poly4vinyl pyridine (S4VP, PS Mn 41.5 kg/mol, P4VP Mn 17.5 kg/mol) is stirred in toluene at the concentration of 0.5 wt % for a day at room temperature. Gold nanoparticles (Sigma-Aldrich, 10 nm particle size) as a Li dendrite guide material are added to the solution at the concentration of 1 wt %, and stirred for 6 hours so that Au may be bonded into S4VP micelles. The solution is spin-coated on the obtained lower solid electrolyte film at the rate of 3,000 ppm to arrange a single layer of S4VP micelles into a pattern through self-assembly. FIG. 5 is an AFM image of the obtained suppressive layer. The bright area indicates the micelle, and the dark area indicates the lower solid electrolyte film. In this instance, the size of the micelle is 40 nm, and the distance between micelles is about 70 nm.

(3) Preparation of Upper Solid Electrolyte Film

An upper solid electrolyte film is prepared by the same method as the lower solid electrolyte film.

(4) Preparation of Multilayer Structure Solid Electrolyte Membrane

The lower solid electrolyte film having the coated guide layer and the upper solid electrolyte film are stacked, and calendaring is performed at 60° C. with the distance between rolls being adjusted to 100 μm. In this instance, the guide layer is placed between the upper and lower solid electrolyte films. A solid electrolyte membrane including the upper solid electrolyte film, the guide layer and the lower solid electrolyte film stacked in that order is obtained. The thickness of the obtained solid electrolyte membrane is about 100 μm. It can be seen that the guide layer in the solid electrolyte membrane is so thin that it does not affect the total thickness of the solid electrolyte membrane.

Example 2

A solid electrolyte membrane is prepared by the same method as Example 1, except that in the preparation of the solid electrolyte membrane, the concentration of the guide material is 2 wt %.

Example 3

A solid electrolyte membrane is prepared by the same method as Example 1, except that in the preparation of the solid electrolyte membrane, polystyrene-block-poly2vinyl pyridine (S2VP, PS Mn 133 kg/mol, P2VP Mn 132 kg/mol) is used as the block copolymer of the guide layer.

Example 4

A solid electrolyte membrane is prepared by the same method as Example 1, except that in the preparation of the solid electrolyte membrane, silver nanoparticles (Sigma-Aldrich, 10 nm) are used as the guide material.

Comparative Example 1

A solid electrolyte membrane is prepared by the same method as Example 1, except that the guide material is not used. Additionally, a battery is manufactured by the same method as Example 1 using the prepared solid electrolyte membrane.

Experimental Example 1: Evaluation of Ionic Conductivity of Solid Electrolyte Membrane The solid electrolyte membranes prepared in each Example and Comparative Example are cut into a round shape of 1.7671 $cm^2$. The solid electrolyte membrane is interposed between two sheets of stainless steel (SUS) to manufacture a coin cell. The electrochemical impedance is measured under the amplitude of 10 mV and the scan range of 500 Khz to 20 MHz at 60° C. using an analyzer (VMP3, Bio logic science instrument), and ionic conductivity is calculated based on the measurements.

Experimental Example 2: Evaluation of Initial Discharge Capacity and Life Characteristics The initial discharge capacity is evaluated by charging and discharging the batteries manufactured in Examples 1 to 4 and Comparative Example 1 at 0.05C, 60° C.

Charge condition: CC (constant current)/CV (constant voltage), (4.15V, 0.005C current cut-off)

Discharge condition: CC (constant current) condition 3V, (0.05C)

In the life evaluation during charging and discharging at 0.1C, the short circuit occurrence time is determined as the point in time (cycle) of abnormal behavior of voltage (unstable voltage change) during charging.

TABLE 1

|  | Ionic conductivity (S/cm, 60° C.) | Discharge capacity (mAh/g, 4.15 V) | Short circuit occurrence time (cycle) |
| --- | --- | --- | --- |
| Example 1 | 8E–05 ($8 \times 10^{-5}$) | 150 | 23 |
| Example 2 | 8E–05 ($8 \times 10^{-5}$) | 149 | 29 |
| Example 3 | 7E–05 ($7 \times 10^{-5}$) | 145 | 22 |
| Example 4 | 8E–05 ($8 \times 10^{-5}$) | 147 | 21 |
| Comparative Example 1 | 1E–04 ($1 \times 10^{-4}$) | 156 | 5 |

As shown in the experimental results, it can be seen that when the growth guide material for lithium dendrites is added, the life characteristics are improved with a slight decrease in ionic conductivity. It may be interpreted that the guide material serves as seed crystals well. In this instance, the amount of metal particles or uniformity of the coating layer is important, and particularly, it is found that the inclusion of the guide layer arranged at nano-scale through self-assembly of block copolymers in the solid electrolyte membrane improves the life characteristics more effectively. FIG. 5 is an AFM image of the surface of the suppressive layer prepared through Example 1, showing that micelles including metal particles are arranged in a layer structure within the solid electrolyte membrane and they form a uniform pattern.

DESCRIPTION OF REFERENCE NUMBERS 10 conventional all-solid-state battery, 11 positive electrode current collector, 12 positive electrode active material layer, 13 solid electrolyte membrane, 14 lithium metal negative electrode, 14a lithium dendrite, 100 all-solid-state battery, 110 positive electrode current collector, 120 positive electrode active material layer, 130 solid electrolyte membrane, 140a lithium dendrite, 140b guided horizontally grown lithium dendrite, 140 lithium metal negative electrode, 131 metal particle, 131a alloy with lithium

What is claimed is:

1. An all-solid-state battery comprising
a solid electrolyte membrane, the solid electrolyte membrane comprising a guide layer, wherein the solid electrolyte membrane comprises a solid electrolyte material and metal particles, wherein the metal particles form an alloy with lithium during operation of the battery, and further wherein the guide layer is disposed in a layer shape within the solid electrolyte membrane and is patterned such that the guide layer comprises a plurality of pattern units comprising a guide material, and the pattern units are regularly distributed in the guide layer.

2. The all-solid-state battery according to claim 1, wherein the guide layer comprises the guide material and a copolymer to which the guide material is chemically bonded, the guide layer has a pattern derived from self-assembly of the copolymer, the copolymer comprises a functional group capable of forming a chemical bond with the guide material, and the guide material and the copolymer are connected through the functional group.

3. The all-solid-state battery according to claim 1, wherein the metal particles have a Li metal nucleation overpotential of 100 mV or less.

4. The all-solid-state battery according to claim 1, wherein the solid electrolyte membrane comprises at least one of Au, Ag, Pt, Zn, Mg, Al, Ni and Bi as the metal particles.

5. The all-solid-state battery according to claim 1, wherein the guide layer is 1 nm to 1,000 nm in thickness.

6. The all-solid-state battery according to claim 1, wherein the solid electrolyte material comprises a polymer-based solid electrolyte material.

7. The all-solid-state battery according to claim 6, wherein the polymer-based solid electrolyte material comprises a polymer resin and a lithium salt, and further wherein the polymer-based solid electrolyte material exhibits ionic conductivity of $1 \times 10^{-7}$ S/cm or above.

8. The all-solid-state battery according to claim 1, wherein the metal particles have a particle size of 1 nm to 5 µm.

9. The all-solid-state battery according to claim 1, wherein the metal particles are present in an amount of 0.1 wt % to 20 wt % based on 100 wt % of the solid electrolyte membrane.

10. The all-solid-state battery according to claim 1, wherein the all-solid-state battery comprises a negative electrode comprising a lithium metal as a negative electrode active material or a current collector with no negative electrode active material.

11. The all-solid-state battery according to claim 1, wherein the all-solid-state battery comprises a negative electrode, a positive electrode and a solid electrolyte membrane, the solid electrolyte membrane is interposed between the negative electrode and the positive electrode, at least one of the negative electrode and the positive electrode comprises a solid electrolyte material, and the solid electrolyte material comprises at least one of a polymer-based solid electrolyte, an oxide-based solid electrolyte and a sulfide-based solid electrolyte.

* * * * *